UNITED STATES PATENT OFFICE.

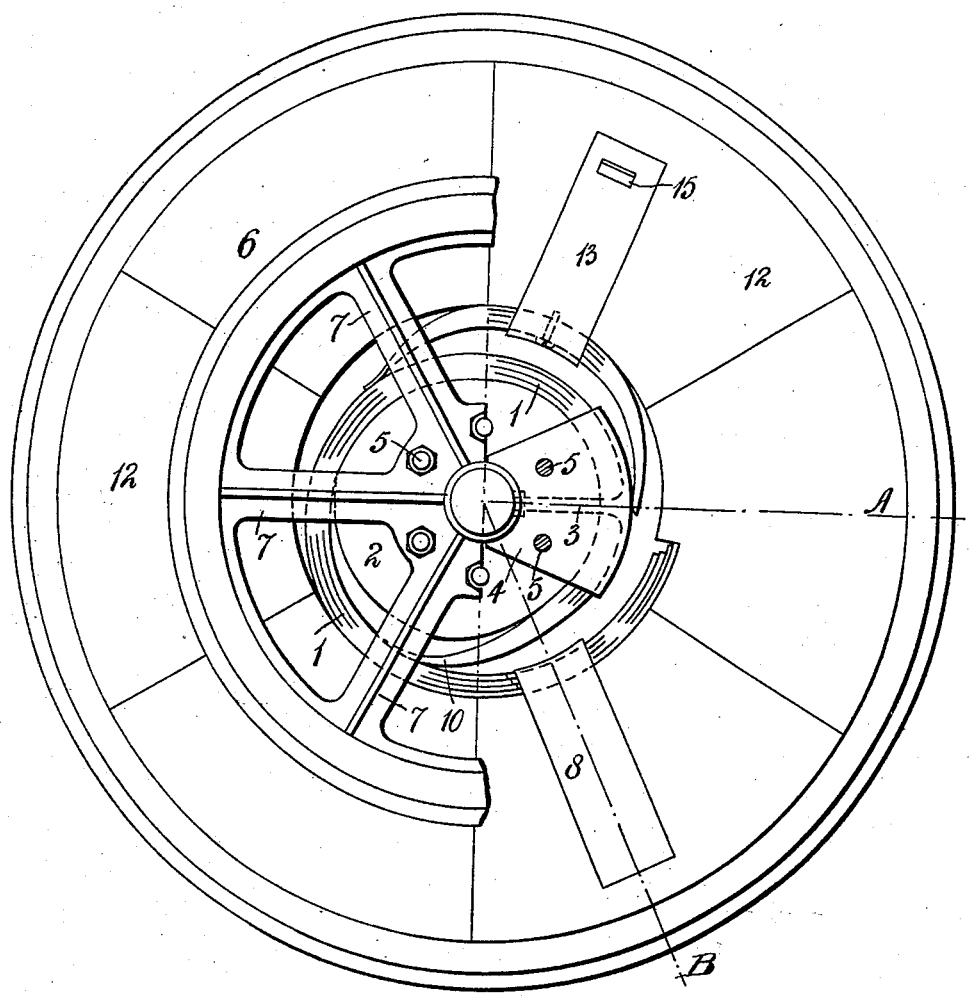

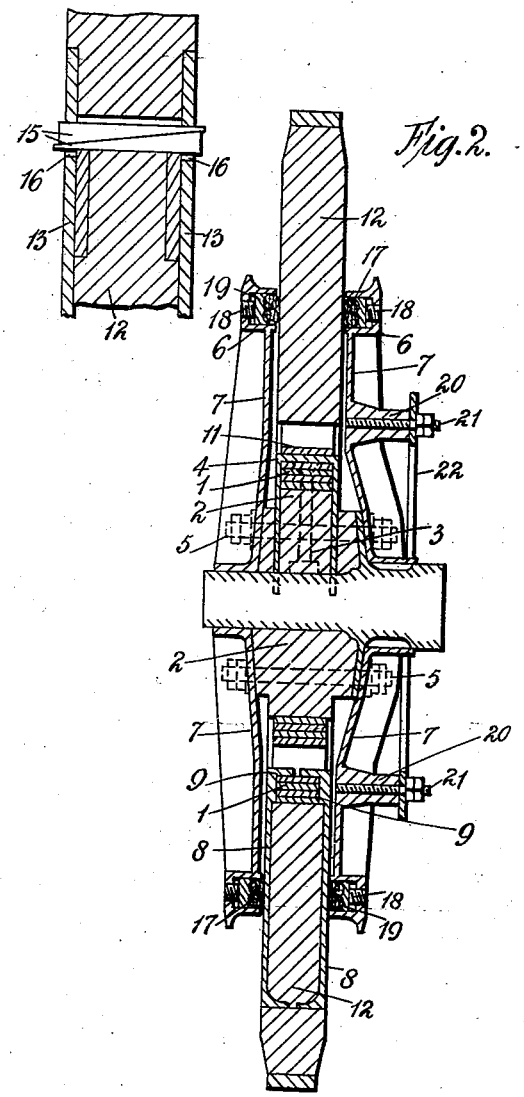

WILLIAM HARRINGTON SCRYMGOUR, OF LONDON, ENGLAND.

WHEEL FOR VEHICLES.

No. 899,331.　　　　　Specification of Letters Patent.　　　Patented Sept. 22, 1908.

Application filed August 12, 1907. Serial No. 388,208.

*To all whom it may concern:*

Be it known that I, WILLIAM HARRINGTON SCRYMGOUR, a subject of the King of Great Britain and Ireland, and resident of 13 Lovell's Court, Paternoster Row, London, county of London, England, have invented certain new and useful Improvements in Wheels for Vehicles, of which the following is a specification.
My invention relates to wheels for vehicles in which springs are interposed between the rim and the hub of the wheel and my invention consists, more especially, in improvements in the spring arrangement of wheels otherwise constructed in accordance with the specification of British Patent No. 26382, A. D. 1905, granted to me.

According to my present invention, I connect the hub to the outer part, or rim by means of a coiled, or spiral, and sufficiently springy, metal piece, (preferably consisting of plates, or laminations) which is secured at, or towards, one end, to the hub, and, at, or towards, the other end, to the interior of the rim, but instead of relying on this springy metal piece for the necessary resiliency and to make the construction stronger, I use the said piece generally as a means of connecting the hub to the outer part, or rim, and, in the space between, the hub and the interior of the rim, I provide metal springs, for giving a yielding bearing between the outer part, or rim, and the hub and the said coiled, or spiral, metal piece.
Spoke-like arms secured directly or indirectly to the hub and provided with parts bearing against the sides of the rim, can be employed for example as described in the aforesaid specification of my application for Letters Patent No. 26382 A. D. 1905 or otherwise so as to give sidewise rigidity and allow of sliding movement between the said spoke-like arms and the rim, and ring-pieces and filling pieces can be used between the said spoke-like arms and the outer ends of the said arms may carry, or be formed in one with, rings of metal provided with flexible, or yielding, material to bear on the sides of the rim to exclude dirt and dust and arrangements at each side of the wheel, generally analogous to the arrangements described in the specification of my aforesaid Letters Patent, can be employed with the spring arrangements according to my present invention.
The springs can be arranged, and secured in position, in accordance with my present invention, in the manner I will now describe with reference to the accompanying drawing, but I do not limit myself to the precise arrangements illustrated. I will presume that laminated springs are to be used.

Figure 1 is a side elevation, the right-hand half having the parts bearing on the side of the wheel removed, the dust excluding parts between the arms 7 being also removed from both sides. Fig. 2 is a section, the upper part of which is taken on the line A, and the lower part of which is taken on the line B, Fig. 1. Fig. 3 is a sectional view of the clip or saddle-piece and means for tightening up the same.

A coiled, or spiral, metal piece 1, formed of laminations, or plates, is secured at, or towards, one end of the hub 2, which may be done by a bolt 3, (or bolts), passing through the said coiled, or spiral, metal piece 1 and into, or through, the hub 2, which, if the bolt, or bolts, be not passed entirely through the hub as shown, can be provided with a side opening, or side openings, for the insertion of the nut, or nuts, and screwing it, or them, onto the bolt or bolts. A clip or saddle piece 4 is passed over the said coiled, or spiral, metal piece 1 at this fastening place and extended over each side of the hub 2, and secured by one, or more, of the bolts 5, by which the central plate of the spoke-like arms 7 and connecting rings 6, are secured. The inner end of the clip, or saddle piece 4, is preferably made to fit upon the axle-box, as shown. The said coiled, or spiral, metal piece 1, is secured at, or towards, its other end, to the rim, which can be done by a clip, or saddle-piece 8, made in two parts and shaped, (as shown at 9 in Fig. 2) so that the parts, at each side engage with recesses in the edges of the plates, or laminations of the said coiled, or spiral, metal piece 1, the recesses in the plates, or laminations, next the rim being, preferably, such that the clip, or saddle-piece holds them tightly, while the recesses in the other plates, or laminations, of the said coiled, or spiral metal piece 1, are of a length to allow some play. The outer ends of the clip, or saddle-piece 8, are shown as being turned inwards and received in slots cut in the rim (see Fig. 2). The two parts of the said clip, or saddle-piece 8 interlock with each other where they bridge the coiled, or spiral, metal piece 1 so as to resist sidewise strain. The plates, or laminations of the coiled, or spiral, metal piece 1, are preferably arranged so that they, at one, or both, of their ends, are shaped and set back, like the ends of laminated carriage springs. In the drawing the inner ends only are shown as being so arranged, the spring constituted by this end bearing on a part of the said coiled, or spiral metal piece 1, next the rim as shown at 10, the said ends of the coiled, or spiral, metal piece 1 thus acting as one of the springs interposed between the rim and the hub to give resiliency. If a similar spring be formed at the outer end of the said coiled, or spiral, metal piece 1 next the rim, it will bear on a part of the said coiled, or spiral, metal piece 1, next the hub and thus constitute another of the springs to give resiliency. In any case a metal spring, or metal springs, to give resiliency (and preferably made of plates, or laminations) is, or are, situated, in the space between the hub and the rim, and are bent at their free ends so as to act with spring pressure between the rim and the hub as they move relatively to each other, and the said springs may be, for instance, set at their root ends, or body parts, in recesses in the inner periphery of the rim, and be secured by bolts, or clips, or both.

The screw nuts of the bolts, when these are used, can be introduced into recesses in the side of the rim so that they can be screwed on to the bolts from the side. Or two springs may be made from one series of laminations, or plates, by bending the two ends suitably, and these may be secured by clips at their middle. In the drawing the resiliency springs, other than that at 10, are shown as being constituted by the ends of the laminations or plates, 11, secured to the outer, or rim, part 12 by the clip or saddle-piece 13 extending partly over the sides of the rim. This clip, or saddle-piece 13 can (as shown in section in Fig. 3) be tightened up by means of cotters 15, passed through openings 16 in the said clip, or saddle-piece and through the rim 12, and through strengthening plates, if desired, at each side of the rim as shown, the openings being so relatively disposed that the driving in of the cotters 15 will tighten up the clip, or saddle-piece 13. These two cotters can be replaced by a single cotter provided with a screwed end on which works a screw nut for tightening up and loosening the said cotter. The laminations, or plates, of the springs 10 and 11, in the space between the hub and the rim, or outer part, are of such length that the nose ends of the said springs are like those of laminated carriage springs the nose ends bearing, as shown against the portions of the coiled, or spiral, metal piece 1, which are opposite them and they are bent to such shape, and tempered, so that, when in place, they will exercise the necessary pressure and keep to their work when the hub and rim, or outer part, move relatively to each other.

I have shown the rings 6 around the ends of the spoke-like arms 7 as being recessed on their inner faces to carry rope, or other packing 17, which can be pressed forward by screws 18 acting on a ring 19 in the recess at the back of the packing, but the arrangement described in my aforesaid specification, or any other suitable arrangement, may be used in place of this.

I have shown the inner series of spoke-like arms 7 as being provided with internally screwed projections 20 to receive the screws 21 securing the sprocket wheel 22 for a chain driven wheel, but the invention is of course not limited to such a wheel.

Having now described my invention what I claim as new and desire to secure by Letters Patent of the United States is:—

In vehicle wheels a coiled, or spiral springy metal-piece, secured at, or near, one end, to the hub, and at, or near the other end, to the interior of the outer part or rim, and metal springs to give resiliency, and strength in the space between the hub and the interior of the outer part, or rim, and bearing on the said coiled or spiral springy metal piece; substantially as hereinbefore described.

In testimony whereof I have affixed my signature in presence of two witnesses.

WILLIAM HARRINGTON SCRYMGOUR.

Witnesses:
ROBT. HUNTER,
DAVID COOK.